(12) United States Patent
Lee et al.

(10) Patent No.: US 9,900,662 B2
(45) Date of Patent: Feb. 20, 2018

(54) SOCIAL DATA ASSOCIATED WITH BOOKMARKS TO MULTIMEDIA CONTENT

(71) Applicant: VMTV, Inc., Palo Alto, CA (US)

(72) Inventors: David D. Lee, Palo Alto, CA (US); Jaegeun Lim, Seoul (KR); Dongcheol Jeong, Seoul (KR); Youngwoon Yoon, Seoul (KR); Michael Ken Minakami, Mountain View, CA (US); Chien Lim, San Jose, CA (US)

(73) Assignee: VMTV, Inc., Palo Alto, CA (US)

( * ) Notice: Subject to any disclaimer, the term of this patent is extended or adjusted under 35 U.S.C. 154(b) by 0 days.

(21) Appl. No.: 14/949,719

(22) Filed: Nov. 23, 2015

(65) Prior Publication Data

US 2016/0080820 A1    Mar. 17, 2016

Related U.S. Application Data

(63) Continuation-in-part of application No. 14/639,010, filed on Mar. 4, 2015, now Pat. No. 9,197,593, which
(Continued)

(51) Int. Cl.
| | |
|---|---|
| *H04N 7/10* | (2006.01) |
| *H04N 21/4788* | (2011.01) |
| *H04N 21/81* | (2011.01) |
| *H04N 21/858* | (2011.01) |
| *H04N 21/845* | (2011.01) |
| *H04N 21/235* | (2011.01) |
| *H04L 12/58* | (2006.01) |

(Continued)

(52) U.S. Cl.
CPC ........ *H04N 21/4788* (2013.01); *G06Q 30/00* (2013.01); *G06Q 50/01* (2013.01); *H04L 51/32* (2013.01); *H04L 65/602* (2013.01); *H04L 67/306* (2013.01); *H04N 21/237* (2013.01); *H04N 21/2353* (2013.01); *H04N 21/4126* (2013.01); *H04N 21/47217* (2013.01); *H04N 21/812* (2013.01); *H04N 21/8133* (2013.01); *H04N 21/8153* (2013.01); *H04N 21/8455* (2013.01); *H04N 21/858* (2013.01)

(58) Field of Classification Search
CPC ................................. H04N 21/47217
USPC .......................................... 725/32
See application file for complete search history.

(56) References Cited

U.S. PATENT DOCUMENTS

| | | | |
|---|---|---|---|
| 7,548,565 | B2 | 6/2009 | Sull et al. |
| 7,624,337 | B2 | 11/2009 | Sull et al. |

(Continued)

FOREIGN PATENT DOCUMENTS

| | | |
|---|---|---|
| JP | 2004-177712 A | 6/2004 |
| JP | 2006-174414 A | 6/2006 |
| KR | 10-2009-0112879 A | 10/2009 |

OTHER PUBLICATIONS

PCT International Search Report and Written Opinion, PCT Application No. PCT/US2012/036016, dated Nov. 16, 2012, 9 pages.
(Continued)

*Primary Examiner* — Michael Hong
(74) *Attorney, Agent, or Firm* — Fenwick & West LLP

(57) ABSTRACT

Members of a social network service may share real-time comments about multimedia content they are viewing. The comments are attached to bookmarks that allow other members to view the video and add to the discussion thread.

20 Claims, 23 Drawing Sheets

Related U.S. Application Data is a continuation-in-part of application No. 13/601,874, filed on Aug. 31, 2012, now Pat. No. 9,319,732, which is a continuation-in-part of application No. 13/100,105, filed on May 3, 2011, now Pat. No. 8,725,816.

(60) Provisional application No. 62/105,657, filed on Jan. 20, 2015.

(51) Int. Cl.
  *H04L 29/08* (2006.01)
  *G06Q 50/00* (2012.01)
  *H04N 21/237* (2011.01)
  *H04N 21/41* (2011.01)
  *H04N 21/472* (2011.01)
  *H04L 29/06* (2006.01)
  *G06Q 30/00* (2012.01)

(56) References Cited

U.S. PATENT DOCUMENTS

| | | | | |
|---|---|---|---|---|
| 9,088,822 | B2* | 7/2015 | Relyea | H04N 21/44222 |
| 2003/0025729 | A1 | 2/2003 | Davis | |
| 2003/0041092 | A1 | 2/2003 | Woo | |
| 2010/0027966 | A1 | 2/2010 | Harrang et al. | |
| 2010/0242074 | A1 | 9/2010 | Rouse et al. | |
| 2011/0075990 | A1* | 3/2011 | Eyer | H04N 5/76 386/241 |
| 2011/0107382 | A1 | 5/2011 | Morris et al. | |
| 2013/0006602 | A1 | 1/2013 | Zhu et al. | |
| 2015/0193792 | A1* | 7/2015 | Patel | G06Q 30/0203 705/7.32 |

OTHER PUBLICATIONS

United States Office Action, U.S. Appl. No. 13/601,874, dated Jan. 17, 2014, 8 pages.
United States Office Action, U.S. Appl. No. 13/100,105, dated Dec. 19, 2012, 12 pages.
United States Office Action, U.S. Appl. No. 13/100,105, dated Oct. 8, 2013, 12 pages.
United States Office Action, U.S. Appl. No. 13/601,874, dated Apr. 10, 2015, 8 pages.
United States Office Action, U.S. Appl. No. 13/601,874, dated Sep. 26, 2014, 8 pages.
United States Office Action, U.S. Appl. No. 14/639,010, dated Jun. 4, 2015, 12 pages.

* cited by examiner

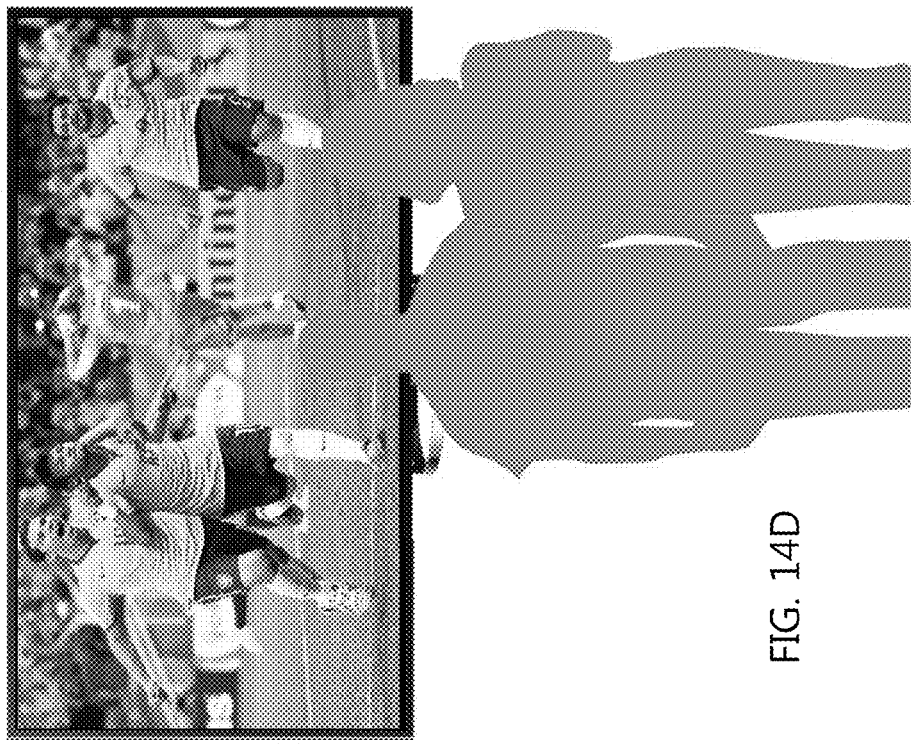
FIG. 14D

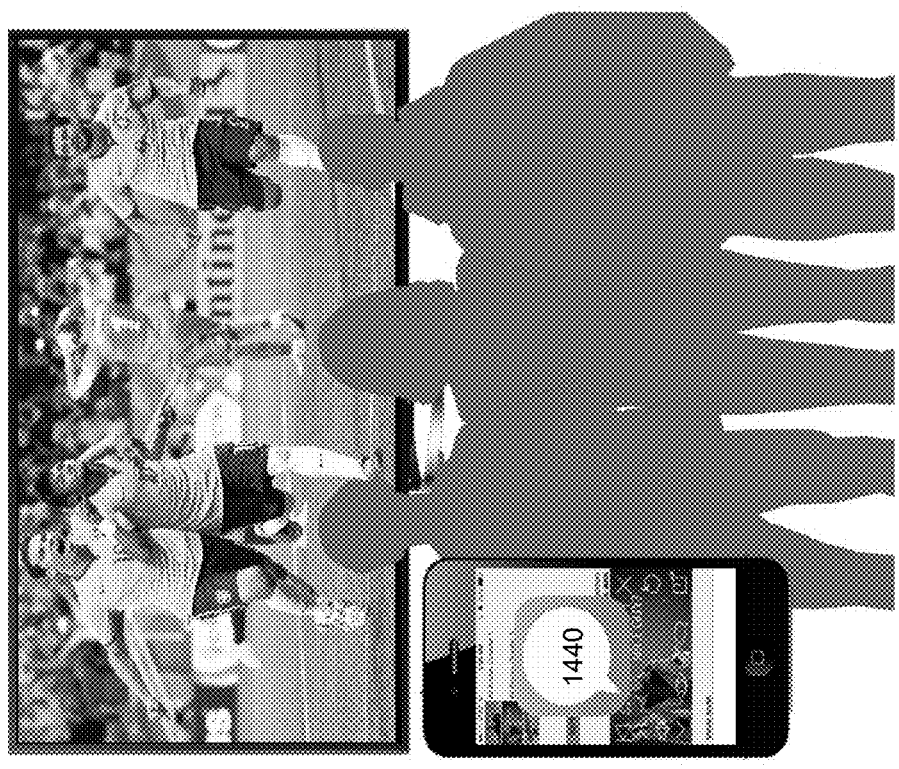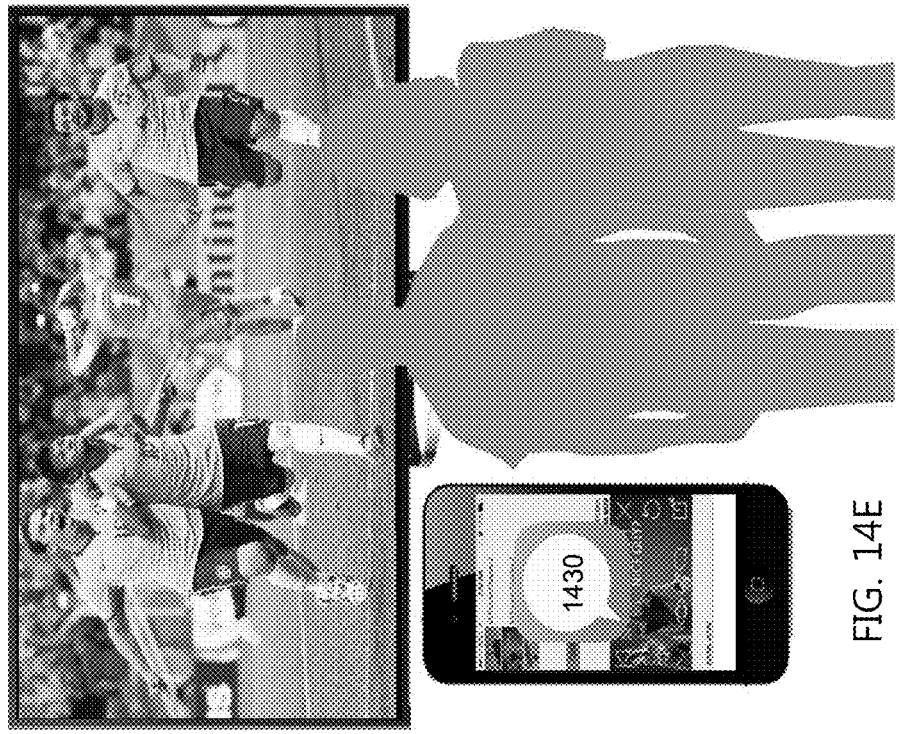
FIG. 14E

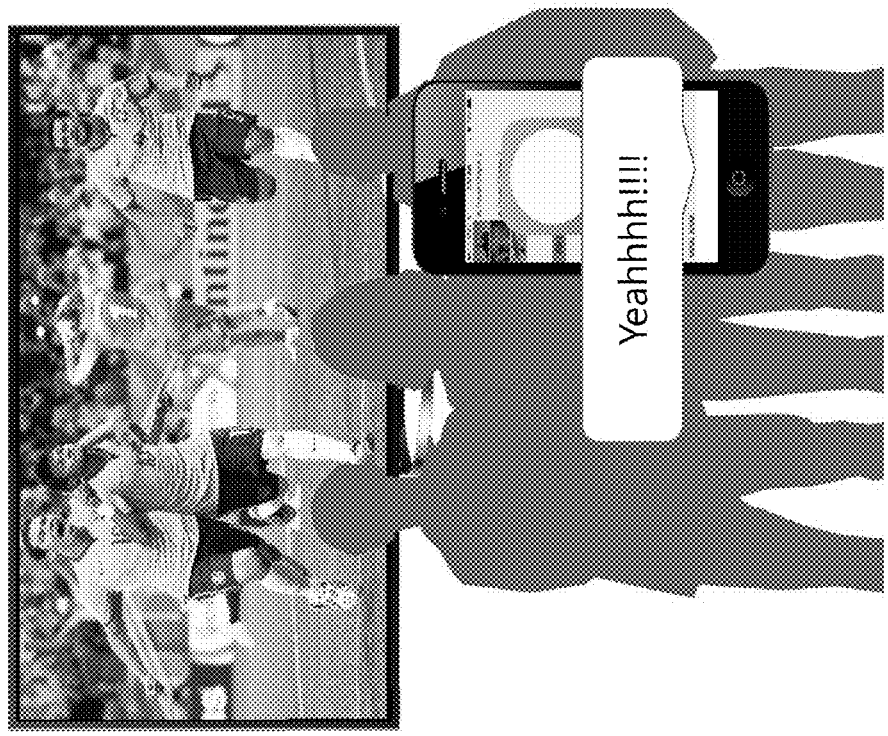
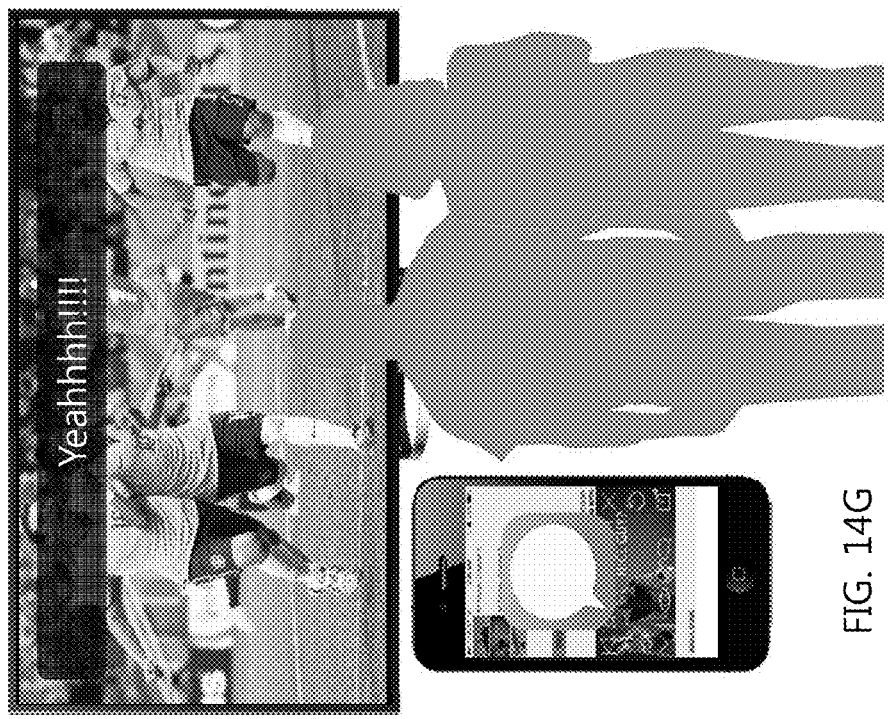
FIG. 14G

Timeline of extracted thumbnail images

SOCIAL DATA ASSOCIATED WITH BOOKMARKS TO MULTIMEDIA CONTENT

CROSS-REFERENCE TO RELATED APPLICATION(S)

This application is a continuation-in-part of U.S. patent application Ser. No. 14/639,010, "Social Data Associated with Bookmarks to Multimedia Content," filed Mar. 4, 2015. U.S. patent application Ser. No. 14/639,010 is a continuation-in-part of U.S. patent application Ser. No. 13/601,874, "Program Guide Based on Sharing Personal Comments about Multimedia Content," filed Aug. 31, 2012; which is a continuation-in-part of U.S. patent application Ser. No. 13/100,105, "Program Guide Based on Sharing Personal Comments about Multimedia Content," filed May 3, 2011. U.S. patent application Ser. No. 14/639,010 also claims priority under 35 U.S.C. § 119(e) to U.S. Provisional Patent Application Ser. No. 62/105,657, "Social Data Associated With Bookmarks To Multimedia Content," filed Jan. 20, 2015. The subject matter of all of the foregoing is incorporated herein by reference in their entirety.

BACKGROUND OF THE INVENTION

1. Field of the Invention

This invention relates generally to sharing personal information about multimedia content, including for example using other people's comments about videos as a basis for a personalized program guide to videos.

2. Description of the Related Art

For many years, television was the dominant form of easily accessible multimedia. As such, it often formed the center of social activities. In the early days of television when not every household contained a television, multiple households might meet at a certain time at a certain place (the place with the television) in order for everyone to watch a certain television program. This behavior was driven by technological constraints. There was only one television and the television program could only be viewed at one specific time determined by the broadcaster.

Advances in technology have essentially removed these constraints. Televisions are now so inexpensive as to be ubiquitous and programming can be viewed on many devices, not just televisions. Furthermore, time-shifting technologies now allow broadcast programming to be recorded and viewed at any later time. Many other types of programming can simply be accessed at any time. Today, it is not uncommon for every person to have personal gadgets for accessing and viewing many different types of multimedia content, not just television, at all times. Thus, it is not uncommon for members of today's household to all be in the same room, but with each member viewing his/her own program on his/her own device. This is in stark contrast to the behavior from long ago. Thus, one might conclude that the behavior of sharing a video-viewing experience is now obsolete, since advances in technology have removed the constraints that in the past forced this behavior.

However, the technological constraints were only one aspect driving the behavior. People often enjoy gathering together to share a video experience. For example, shared viewing experiences happen today, even though they are not forced by technological limitations. A group of friends or floormates within a college dormitory might meet regularly to watch a weekly television series. As another example, sports fans might gather at a local sports bar in order to cheer on their favorite team. This happens not because there is only one television that must be shared; it happens because people enjoy sharing the experience.

However, it is difficult to reproduce a similar experience for people who are connected virtually. Returning to the household example, the daughter might be watching a different program than her parents and siblings, but she might be watching the same program as her friends across town (who are also watching on their devices from their homes) and she might enjoy sharing that experience even though she cannot physically meet with her friends. Thus, there is a need for technology to allow people to do so.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 14A-G show example use cases of the metadata service.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
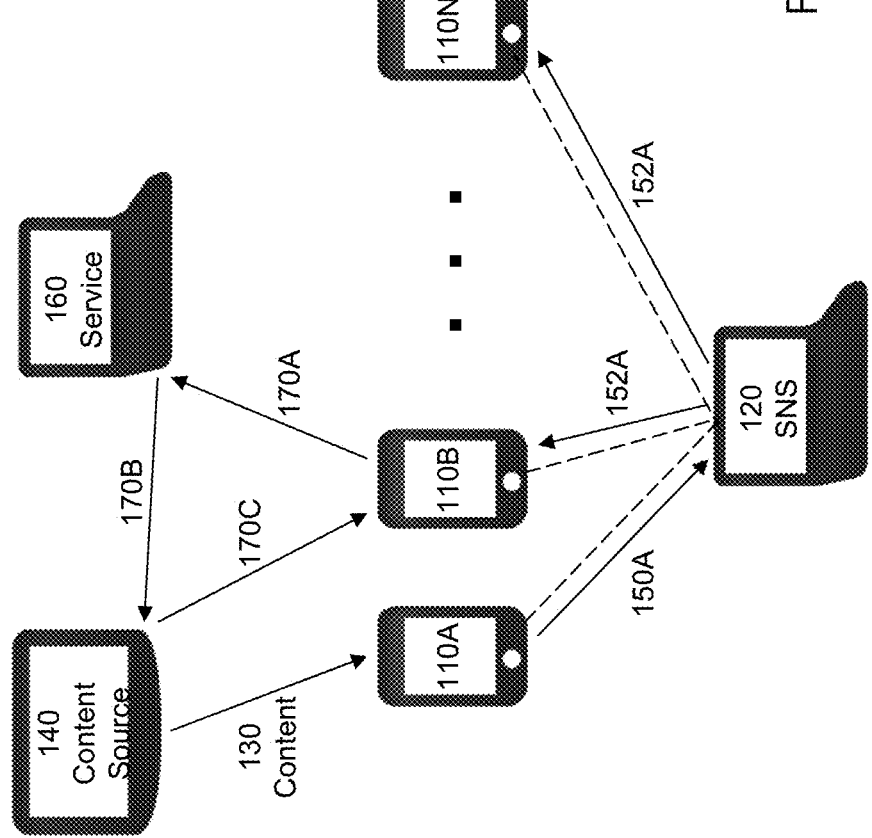
FIG. 1 is a block diagram of a system according to the present invention.

FIG. 1 is a block diagram a system according to the present invention. In FIG. 1, a member 110A of a social network service (SNS 120) is viewing multimedia content 130 from source 140. For example, the member 110A might be watching a broadcast television program. While the member 110A is viewing the content 130, he makes comments 150A about the content 130. He might like or dislike certain parts; he might notice things about the scenery, plot or characters; he could make any types of comments. These comments 150A are shared with other members 110B-N according to the privacy rules for the SNS. The dashed lines in FIG. 1 indicate members of the SNS 120.

However, the comments 150A are not simply forwarded to other members. Rather, the comments 150A are attached to bookmarks that mark corresponding time points in the content 130. For example, the bookmarks might be thumbnails of the corresponding frames in the television program (or a sequence of thumbnails such as an animated GIF). The bookmarks can come from different sources. For example, they might be provided by the source 140 along with the content 130. Alternately, they might be generated by the member's viewing device as he is viewing the content 130. In another approach, the bookmarks might be provided by a separate service 160. This bookmarking service may also be referred to as a dynamic metadata service, because it can provide and/or organize metadata beyond just bookmarks. The comments and bookmarks (collectively, referred to as a discussion thread 152A) are forwarded to other members 110B-N.

Upon viewing the comments, other members 110B-N may want to also view the content 130. If they are already viewing the content, they may want to skip to the sequence that was commented on. In either case, they can do so by activating the bookmark. In FIG. 1, member 110B activates the bookmark. This triggers a sequence of events 170A-C. The metadata service 160 translates the bookmark to a corresponding time point for the content 130. It instructs 170B the source 140 to provide 170C the content 130 to member 110B beginning at that time point. Members 110B-N can also provide their own comments and share them with the other members. In this way, members 110 can have a shared viewing experience, even if each member is viewing the content 130 on his/her own device at separate physical locations.

In another aspect, the comments and corresponding bookmarks can be organized into discussion threads for the video. Metadata service 160 stores these discussion threads for subsequent searching by members of the SNS. For example, member 110B might later want to view member 110A's comments about the video, or might want to search for related videos based on member 110A's comments. Public parts of the discussion thread (including aggregate statistics over many members) may also be published more broadly and/or used for searching by a broader public. In this way, a program guide to content can be constructed based on personal comments.

It should be understood that FIG. 1 is just an example and many variations will be apparent. For example, there are many types of multimedia content 130 and many ways to distribute that content. Video is probably the most common form of multimedia content, but other forms can also be accommodated. Video can include live action (sporting events, musical performances, etc.), movies and television programming. It can include live broadcast, broadcast premieres, video on demand and playback of prerecorded video. Distribution channels can include television broadcast, cable and satellite networks, Internet and mobile networks. Accordingly, the source 140 can include television stations, cable and satellite head-ends, Internet sites and a member's local device (e.g., for content that is downloaded onto a member's device and then played back later).

The actual devices used can also vary, even from member to member. First, the device used to view content, activate video bookmarks and share comments could be the same device, but they do not have to be. For example, a member might be watching a television program on his high definition TV but might be social networking via his mobile device (e.g., phone, tablet, pad), with the two activities synchronized. On the other hand, another member might be watching the television program and social networking from a single integrated window running on his laptop computer. Viewing devices include devices supported by the content source 140, including televisions, computers and phones and other mobile devices. Similarly, social networking devices include devices supported by the SNS 120, including wearable devices for example. Common social networking services include Facebook, Twitter, and other forms of instant messaging.

As a final example, the functions provided by the member devices 110, source 140, SNS 120 and metadata service 160 can be allocated in different ways. As described above, the bookmarks can be provided by any of these devices. As another example, rather than notifying 170B the source 140 to start playback of content for a member 110B, the metadata service 160 might initiate playback by sending a message to the member 110B which then gets the appropriate content from the source 140. With respect to SNS 120, the SNS 120 is the source of privacy rules for the members 110, so communications between the members 110 and source 140 or service 160 could run through the SNS 120 rather than occurring directly. Conversely, SNS functions such as privacy controls could be implemented at least in part by the source 140 or service 160.

Figure 2:
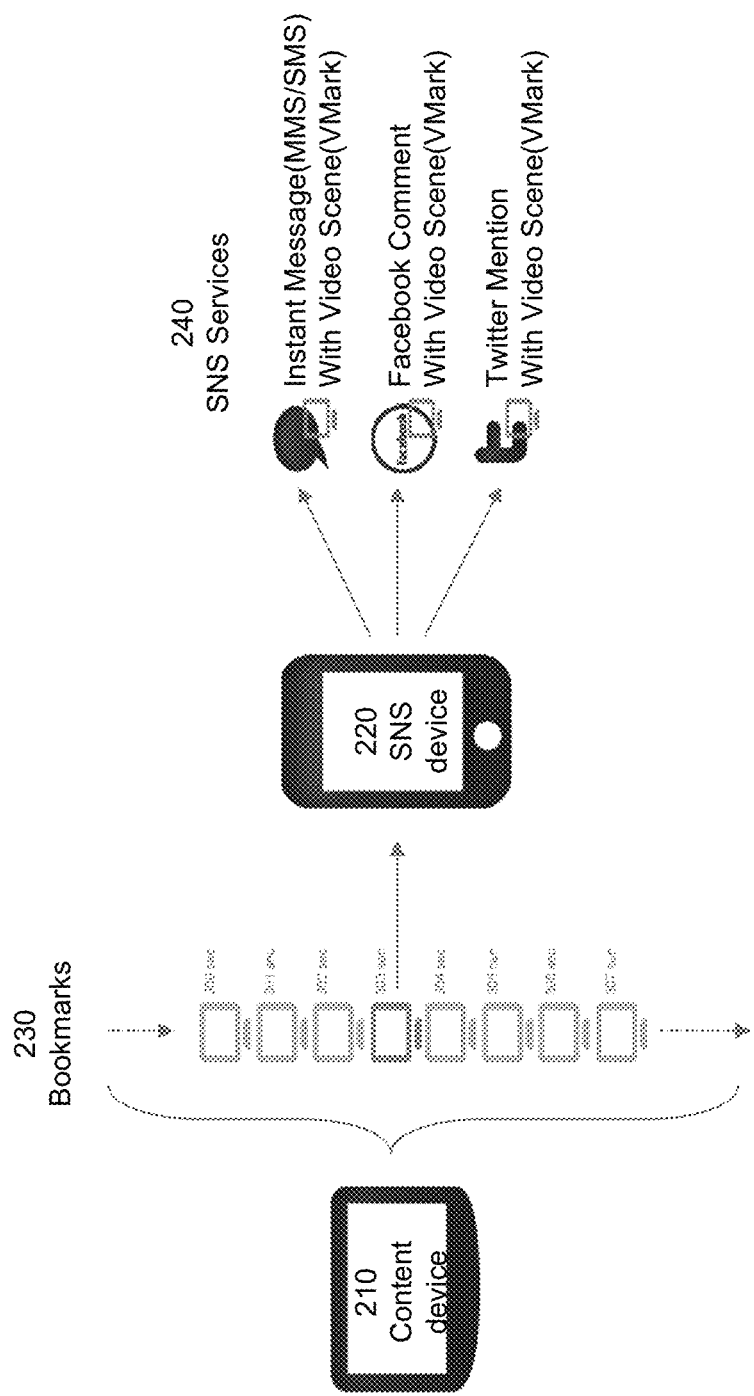
FIG. 2 is a diagram illustrating a member commenting on a video he is viewing.
Figure 3:
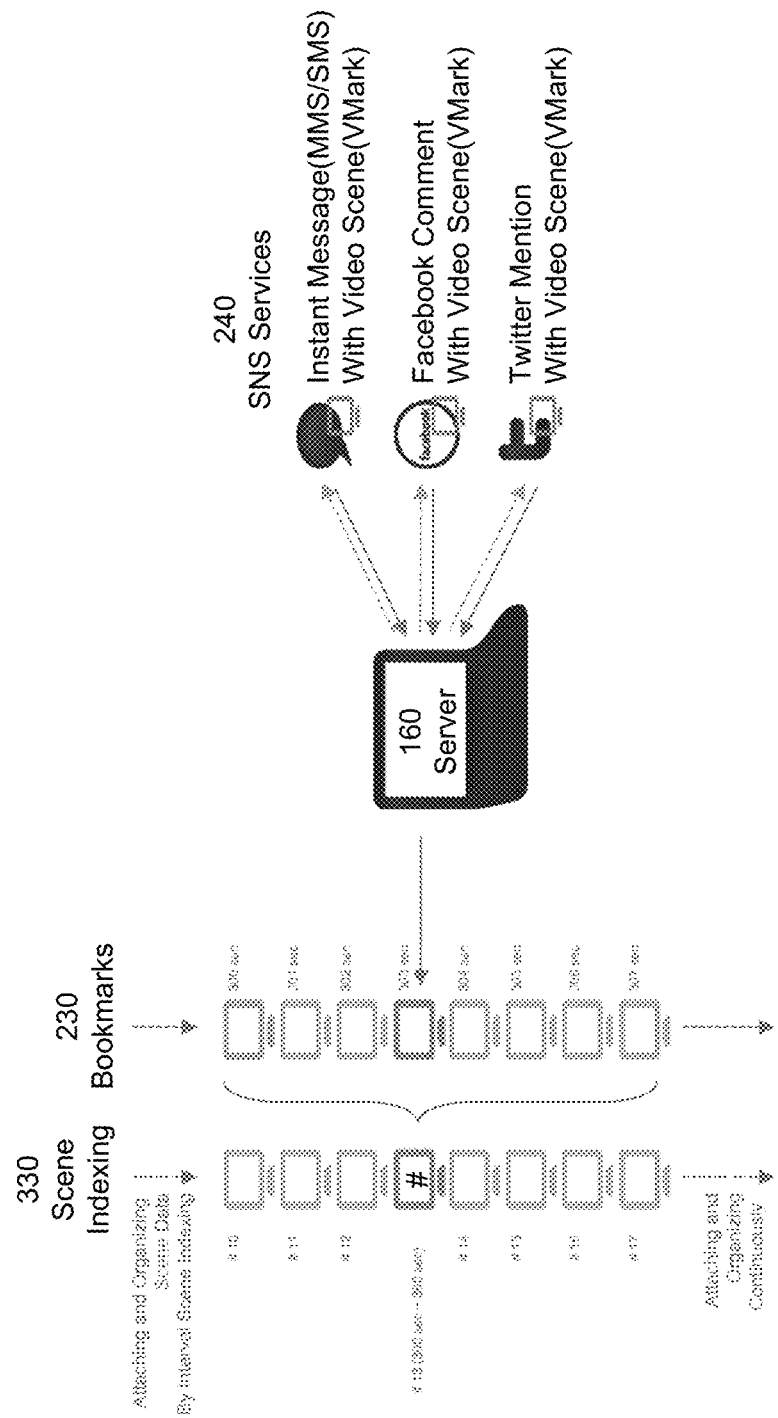
FIG. 3 is a diagram illustrating organizing member comments by scene.
Figure 4:
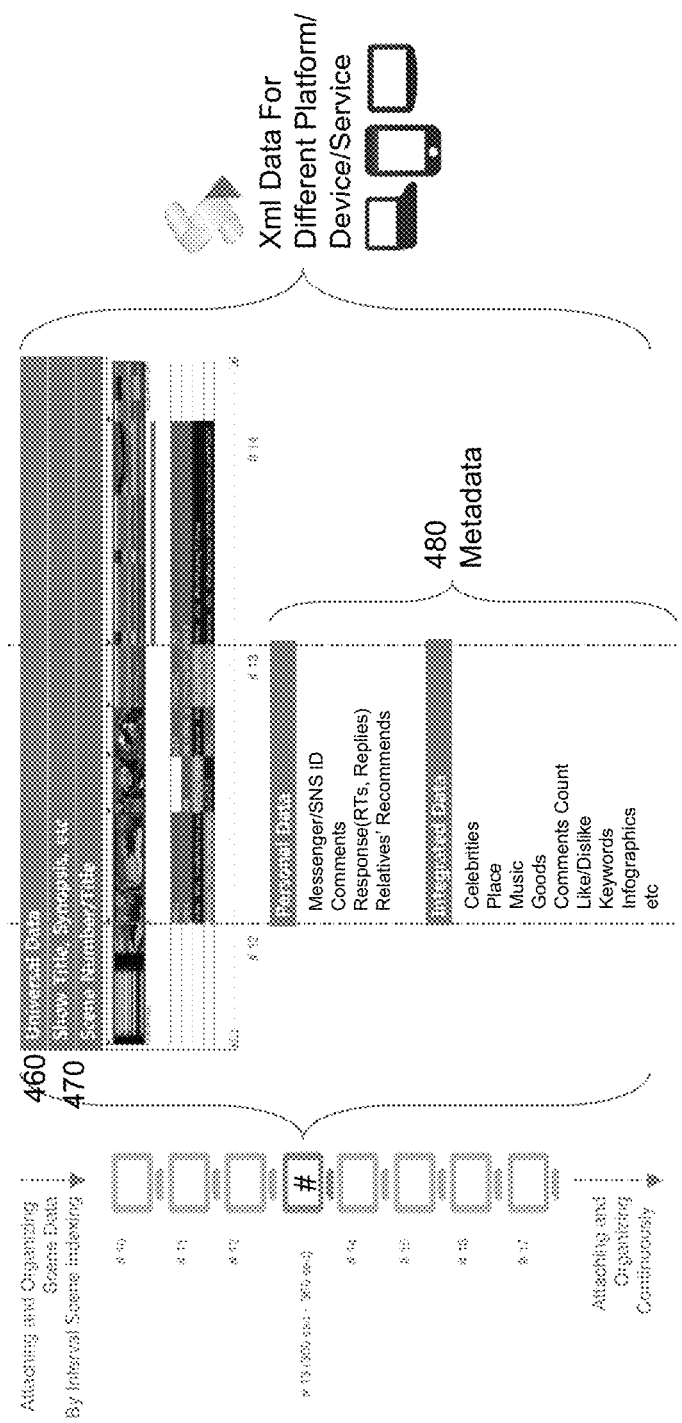
FIG. 4 shows an example discussion thread.

FIGS. 2-4 provide a more detailed example of one implementation. In FIG. 2, a member is commenting on a video he is viewing. In this example, the member is viewing a video on one device 210 and is social networking on another device 220. The video is a live broadcast of an event that is being streamed to the device 210. There is one video bookmark 230 for each second of content. The video bookmarks 230 are provided to the SNS device 220. The bookmarks 230 and video are synchronized. That is, the video bookmark for second 303 is provided to the SNS device 220 at the same time that second 303 is playing on the content device 210. The member can share comments 240 via various SNS. The comments are attached to the video bookmarks (annotated as VMark in FIG. 2). The comments (with VMarks) are shared with other members, who can then also view the video by activating the bookmarks.

FIG. 3 illustrates the organization of comments. Comments 240 are received by the metadata service 160. The service 160 associates the comments 240 with the corresponding time point in the video. In this example, comments are further aggregated by scene 330. For example, seconds 300 to 360 in the video might all correspond to scene 13.

FIG. 4 shows an example organization of this information for scene 13. Sections 460 and 470 contain non-personal metadata about the show. These items could include title, summary, year of release, actors, sex/language/violence rating, video source and other bibliographic information. This can be provided for the entire video or might vary from scene to scene. Actor information could list just the actors appearing in that scene. Other scene information could include setting and background music.

Section 480 includes comments organized for this scene. This data includes personal data such as the actual comments and responses and SNS profile for the commenters. It can also include data that has been anonymized or aggregated so that it can be published to a broader audience. In this example, metadata service 160 organizes, stores and makes this data 480 available to others. Thus, SNS 120 might access the metadata service 160 in order to share comments within groups of members, and more public search engines might catalog the public parts of this data to provide more general searching. In this way, the data collected by metadata service 160 can provide a guide to different types of programming—a personalized program guide of sorts. As shown in FIG. 4, the data preferably is provided in different forms matched to the member's device.

By searching, sorting and reviewing the metadata attached to a scene or a video, a member can learn more about the scene or video and decide whether to view it. For example, a member might search for comments from certain members or a group of members (e.g., his friends) and review these comments to learn about the video. The metadata can be searched or organized in different ways: according to which member is making the comment, according to which members are receiving the comments, according to which members are/have viewed the video, according to content of the comments, by video bookmark, or by level of recommendation (e.g., like/dislike), to name a few. If a member selects a video, he can then add his own comments to the discussion thread. In this way, a rich data set can be built up over time.

Various architectures can be used to implement a metadata service on a computer system. For example see U.S. Pat. No. 7,624,337 "System and Method for Indexing, Searching, Identifying and Editing Portions of Electronic Multimedia Files" and U.S. Pat. No. 7,548,565 "Method and Apparatus for Fast Metadata Generation, Delivery and Access for Live Broadcast Program," both of which are incorporated herein by reference. In one implementation, specialized software applications run on the various devices to implement the video bookmarking and integrated social networking services. In one approach, these applications are provided by a central source. Alternately, APIs may be defined, thus allowing third parties to develop many different versions of these applications. Preferably, the user experience is somewhat standardized so that users can easily use these applications, regardless of which device and which version of the application. In one approach, the metadata service controls and distributes the APIs.

Aggregate data or time-based data can also be presented. For example, trending information might indicate that certain groups of members feel a television show is getting better/worse with each passing episode, or that certain sections within a movie are exciting/boring. Trend setters can use the service to establish followings for new programs.

Figure 5:
FIG. 5 is a screen shot of a main user interface page according to the present invention.

FIGS. 5-9 show screen shots of another implementation. In this example, a member is watching a television program on his television, from broadcast TV station KBS2. At the same time, the member is social networking on a separate mobile device. FIG. 5 is a screen shot of the member's SNS device. The channel choice 510 shows which channel the member is tuned to on his television. In this example, there are two possible channels, KBS1 and KBS2, and the user is watching KBS2. The video bookmark 520 is the bookmark that corresponds to what is currently airing on KBS2. It changes as the television program proceeds. Section 530 shows a history of video bookmarks, showing the current bookmark as well as past bookmarks. In this way, the member can make comments on prior scenes by scrolling back to past bookmarks.

Figure 6:
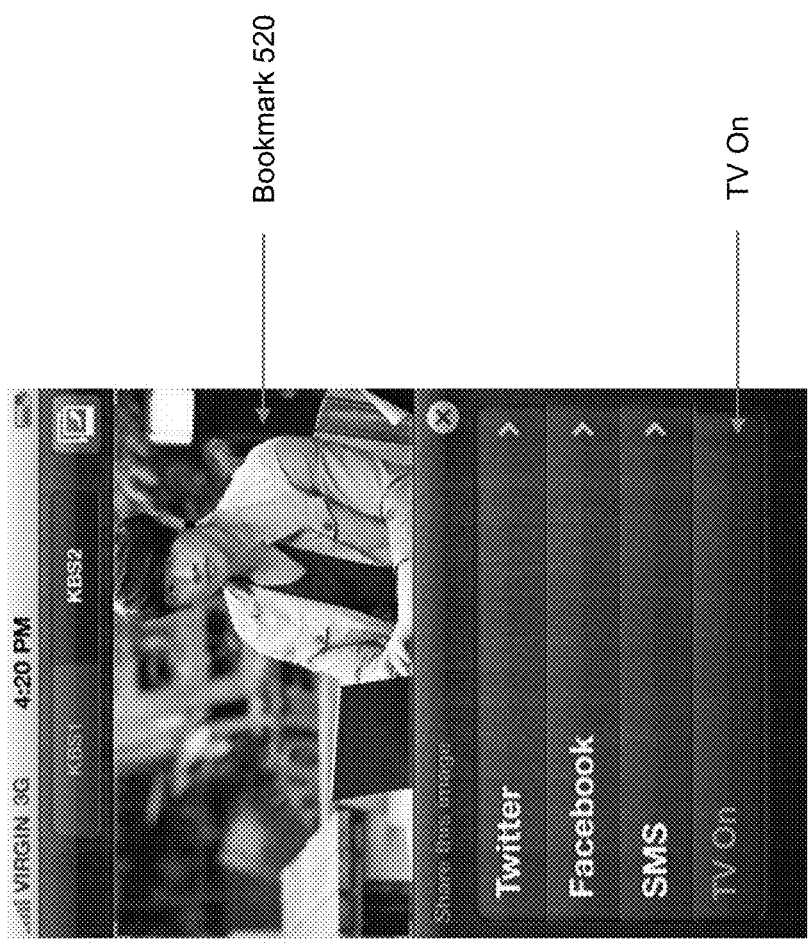
FIG. 6 is a screen shot of a page for sharing comments.

The member can share comments by clicking the sharing arrow 540. FIG. 6 shows the screen after the sharing arrow 540 has been activated. This version of software brings up possible SNS services (Twitter, Facebook and SMS), to make it easy for the member to share the video bookmark 520. The member can also make comments before sharing the bookmark. The "TV on" button can be used to turn on the TV, for example tuning it to the broadcasting channel or start playing recorded/stored video according to the current video bookmark.

Figure 7:
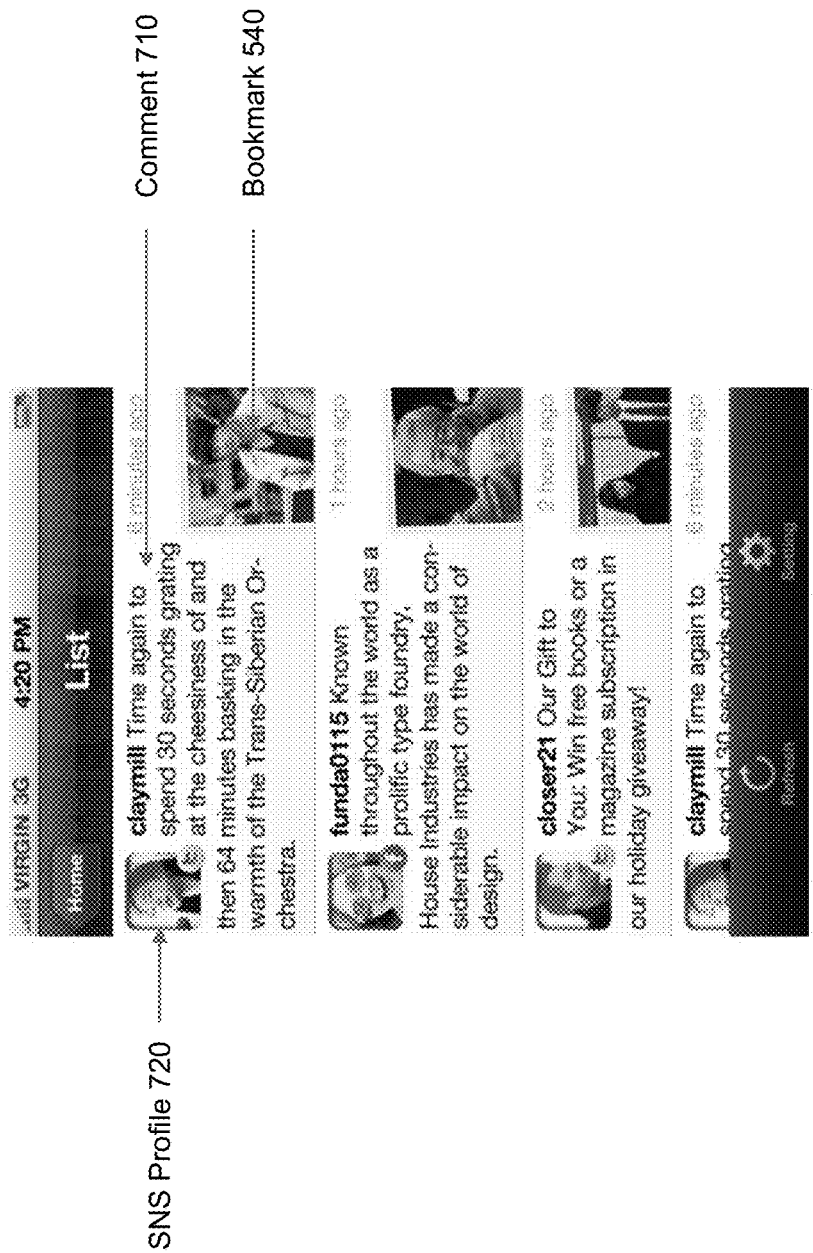
FIG. 7 is a screen shot of a listing of shared comments.
Figure 8:
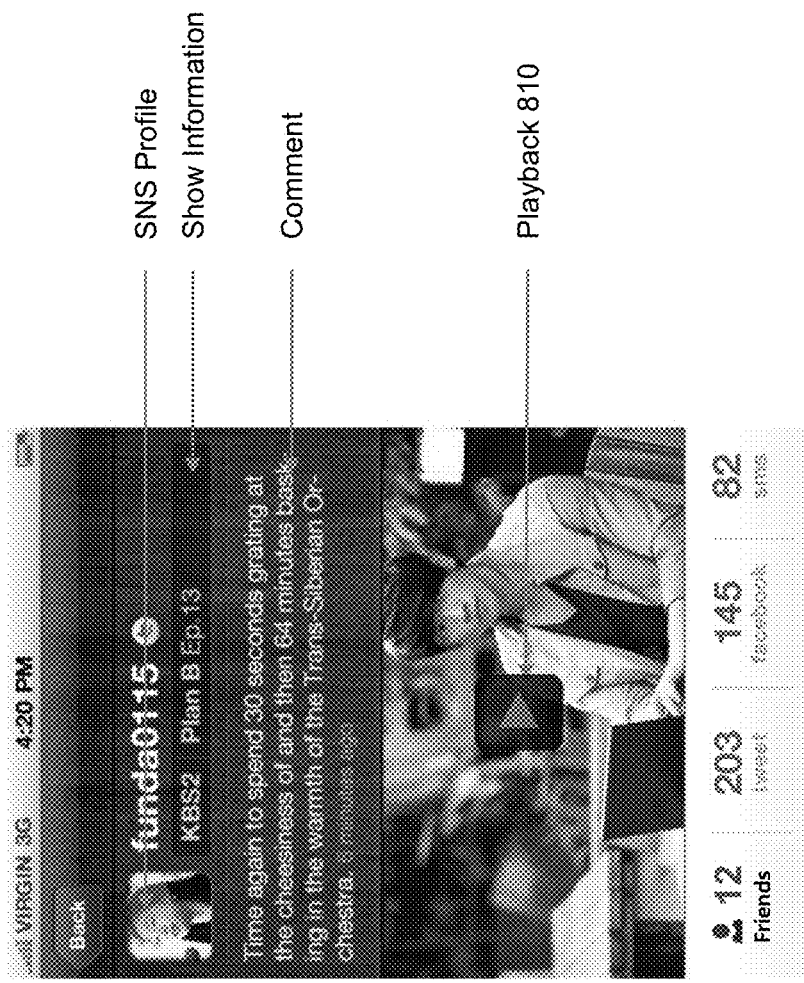
FIG. 8 is a screen shot of a page for activating a video.

The List button 550 in FIG. 5 displays a list of past comments. FIG. 7 shows the screen after the List button is clicked. In this particular display, each entry in the list includes a comment 710, the corresponding bookmark 540, and the SNS profile 720 of the member making the comment. By activating the bookmark 540, the member can bring up more information and eventually start playback of the corresponding video. FIG. 8 shows the screen after a member has activated bookmark 540. In this example, the comment 710 and SNS profile 720 are displayed. Some additional information is provided about the program, as well as about the social networking aspects as shown at the bottom of this screen. In this example, there have been 203 tweets or retweets of this comment, 145 facebook comments or like/dislike actions, and 82 sms (short message service) messages using this video bookmark. These are generally showing quick social media statistics about the video bookmarks. Video playback can be started by clicking the Play triangle 810. The playback preferably is matched to the member's playback device. For example, different screen formats and resolutions might be used for playback on a high definition TV versus a small screen mobile phone. In fact, the playback does not have to be video. For example, it could be teletext. If the video is a newscast, the member might prefer teletext rather than full video.

Figure 9:
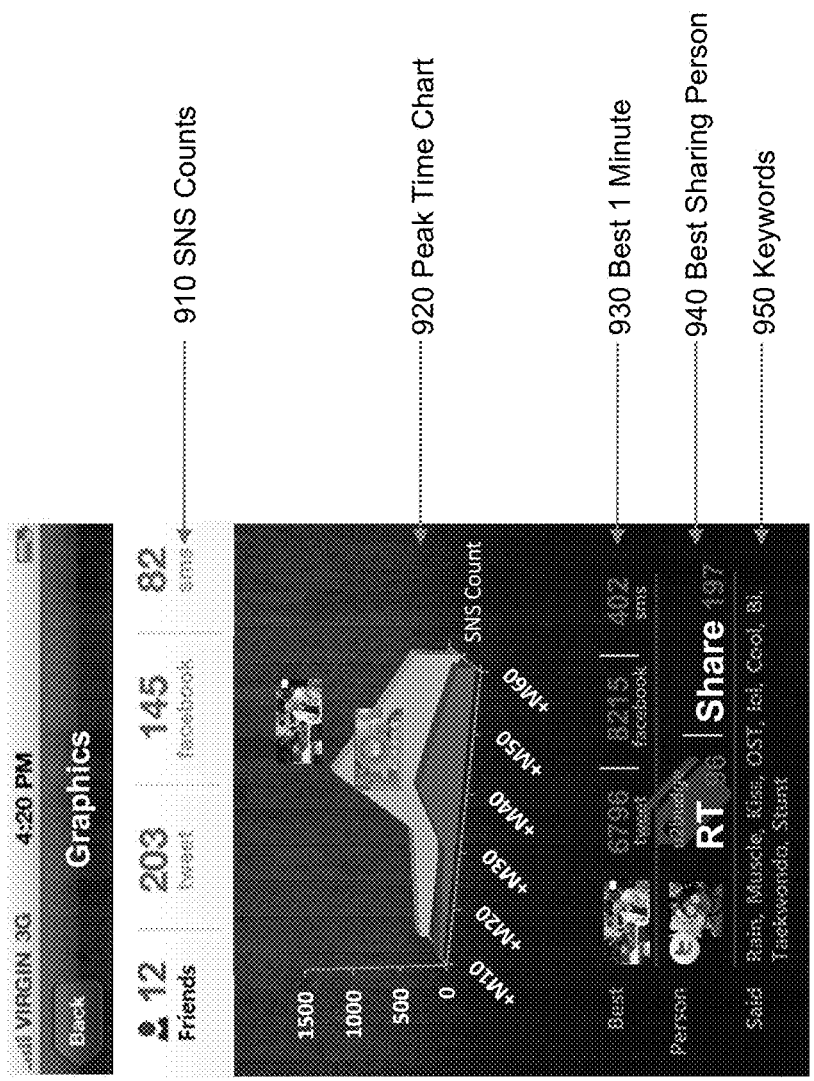
FIG. 9 is a screen shot for a sharing dashboard.

FIG. 9 shows a sharing dashboard. The SNS counts 910 show the number of messages or mentions shared about the video or video bookmark within the same video by Twitter friends (tweets), Facebook friends (facebook), or by friends' SMS or MMS (sms). The Friend's count (Friends) shows the count of the unique users' or friends' IDs in the SNS shared count. The Peak Time Chart 920 has two graphs that show the SNS shared counts (top) and SNS Friend's count (bottom) vs. time lapsed from the beginning of the video. The Best row 930 indicates which time point is considered the best by the community (e.g., the most shared scene within the video). The thumbnail is the video bookmark for the best time point, and the numbers indicate the total messages or mentions by each SNS (tweet, facebook, and sms). The Person row 940 indicates the SNS ID whose video bookmarks or messages are used most by other friends by retweets (RT) or video playback counts (Share). This could be used for rewarding for those who actively send video bookmarks for example. The Said row 950 indicates which words are occurring most frequently in the members' comments. These keywords are saved as metadata and can be used for search and linking dynamic advertising.

Figure 10:
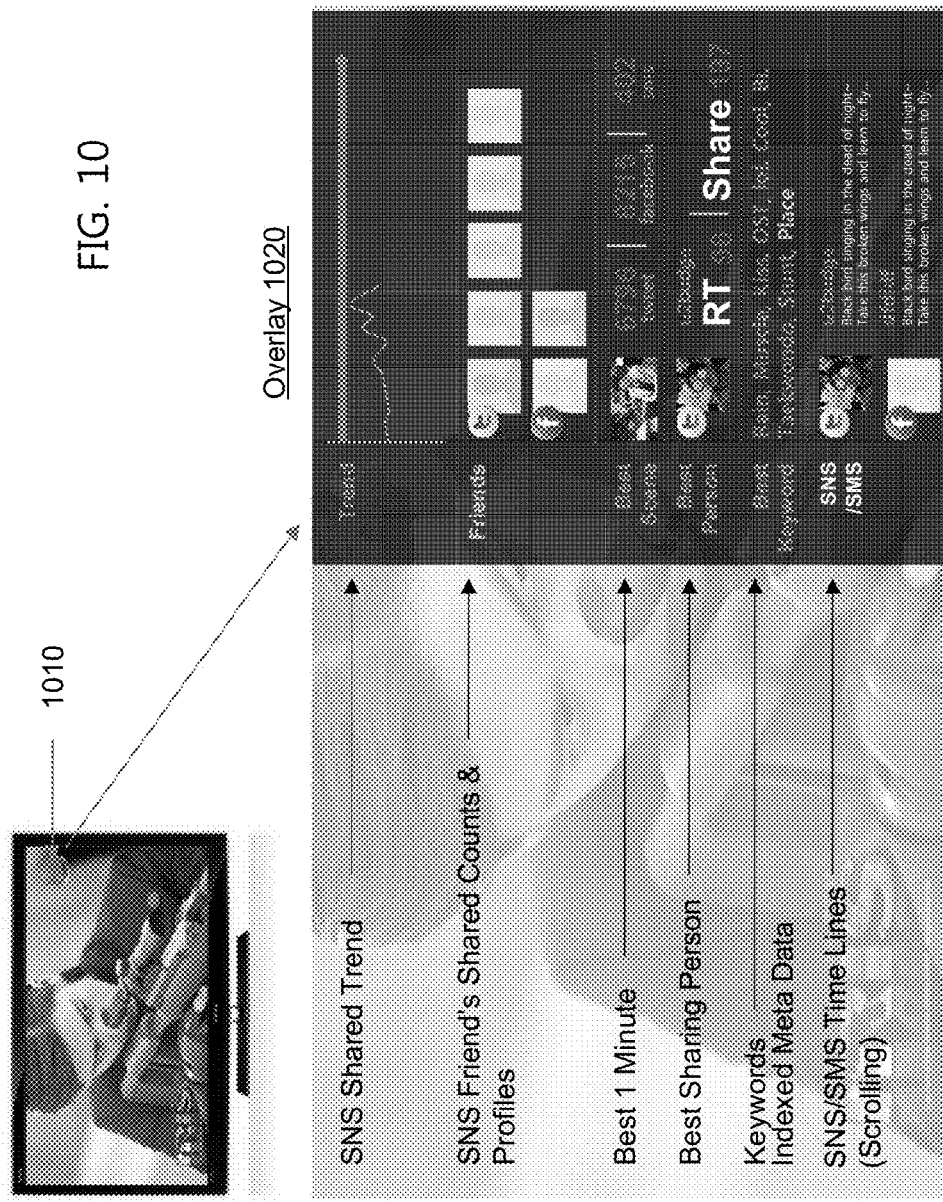
FIG. 10 illustrates another example embodiment according to the present invention.

FIG. 10 shows another example implemented on an Internet-ready TV. In this example, a television program is playing on the TV. However, the TV has a user interface button 1010. When activated, the button overlays a sharing dashboard 1020. The listing of member comments is located at the bottom of the dashboard. The other information is similar to information shown in FIGS. 5-9. In an alternate implementation, the user interface button is not shown on the TV screen, but might be a button on a remote control for example.

Figure 11:
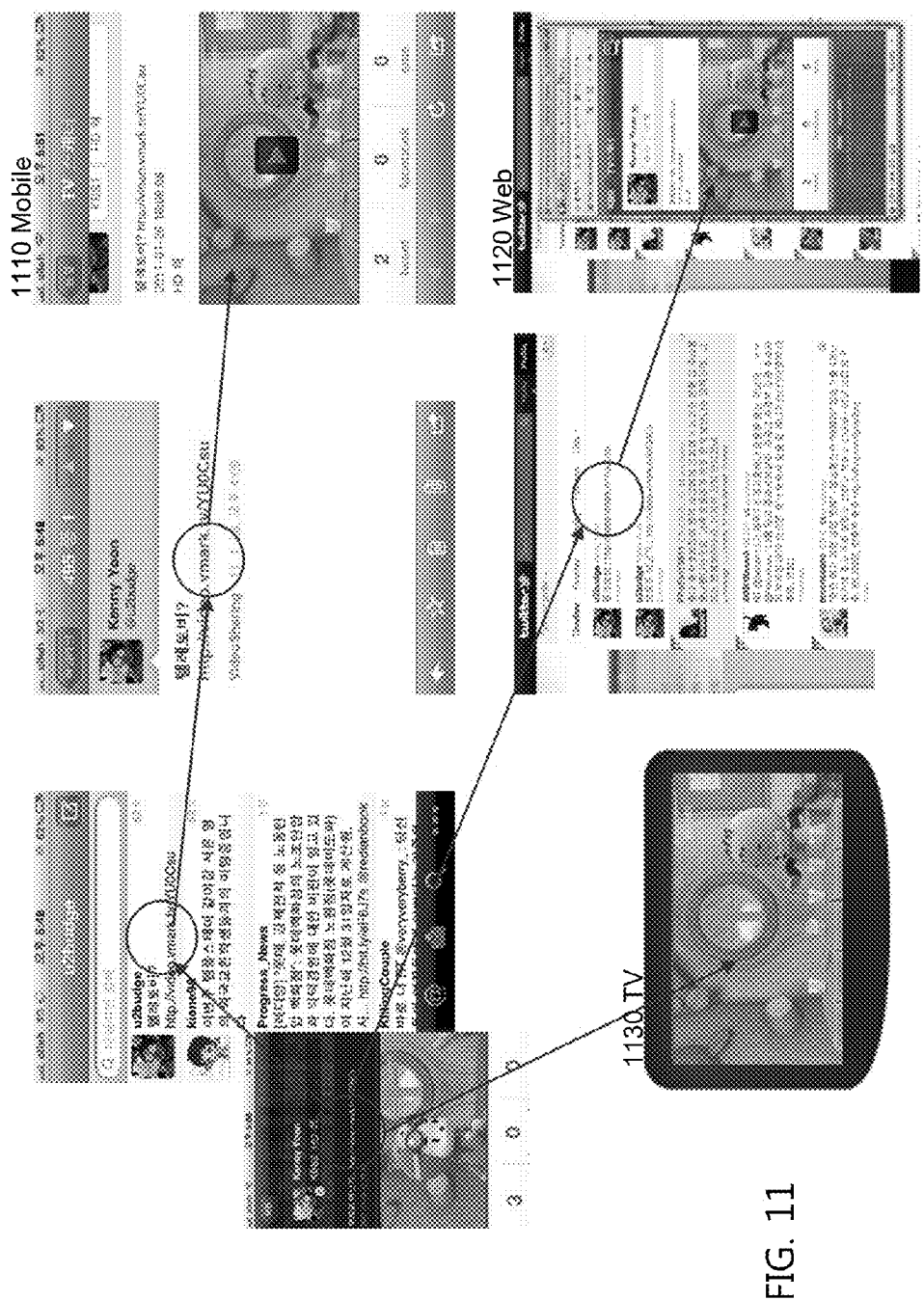
FIG. 11 illustrates distribution of a video bookmark to different devices.

FIG. 11 illustrates distribution of a video bookmark, with playback on different devices. In this example, a user creates a video bookmark, which can be activated for playback on a mobile device 1110, on a web browser on a personal computer 1120, or on a television 1130. In response to clicking the video bookmark, the video bookmark service leads the user to the corresponding source that has the right format for the user's desired device of video playback. For example, mobile servers may have multimedia files optimized for mobile screens, and TV or PC servers may have a multimedia files for high resolution HDTVs.

Figure 12:
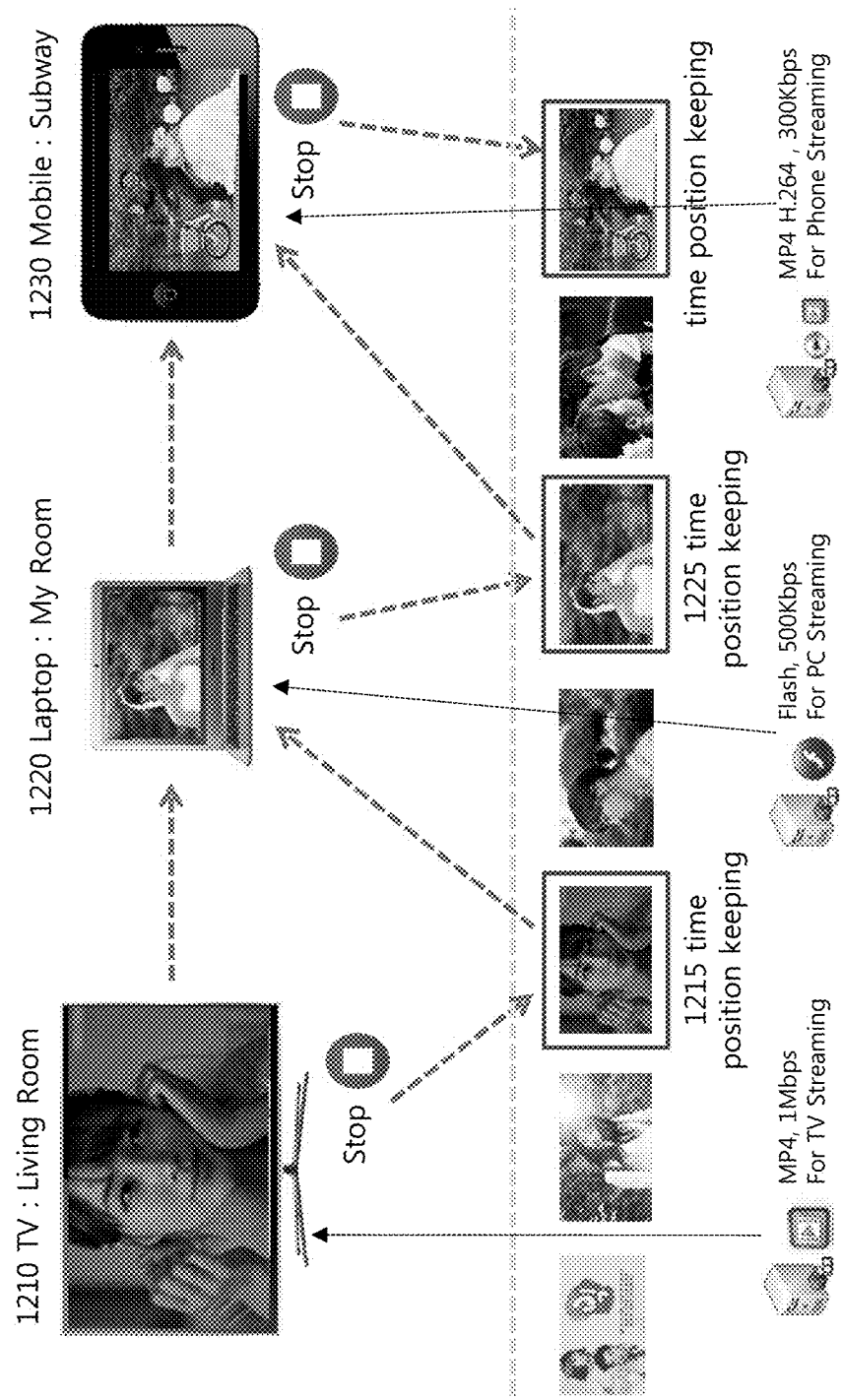
FIG. 12 illustrates use of video bookmarks to synchronize playback on different devices.

FIG. 12 illustrates use of video bookmarks to synchronize playback on different devices. In this example, a user activates a video bookmark to start playback on a television 1210. Since his device is a television 1210, the bookmarking service uses an appropriate format for the content, which in this example is MP4, 1 Mbps streaming. The user stops the playback at some point, which is marked by the video bookmark 1215. The user then resumes playback, but from the laptop 1220 in his room. The bookmarking service knows where to resume playback, based on video bookmark 1215, and uses a different format (flash, 500 Kbps streaming) more suited for the laptop 1220. The user again stops the playback, at a position marked by video bookmark 1225. Playback is resumed on a mobile device 1230 using an appropriate format (MP4 H.264, 300 Kbps). In this manner, video bookmarks can be used to place-shift, time-shift and/or device-shift the playback of content.

Figure 13:
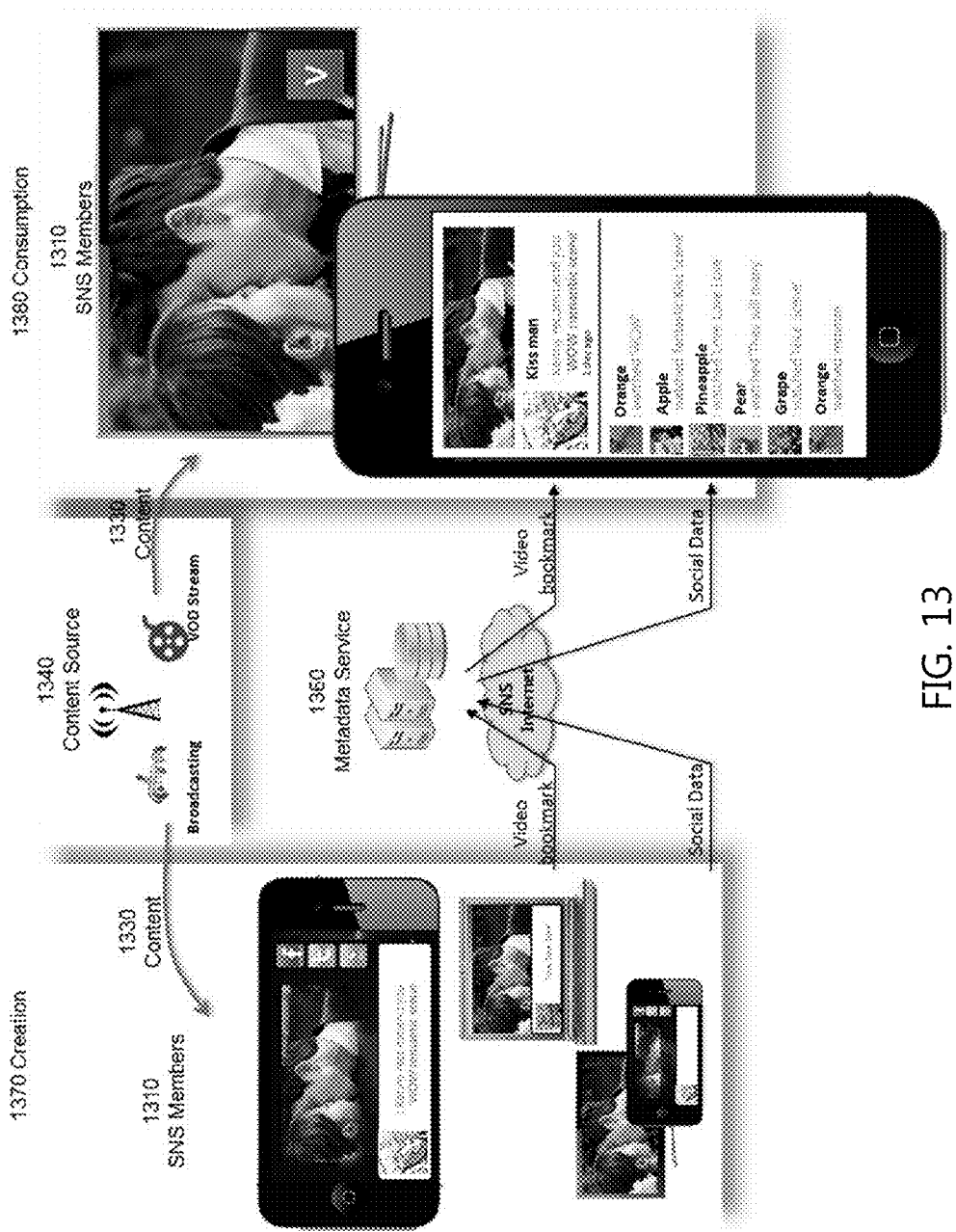
FIG. 13 is a block diagram of a system according to the present invention.

FIG. 13 is a block diagram of another system according to the present invention. In this figure, the left-hand column 1370 represents the creation/generation of bookmarks and data from SNS (e.g., comments, recommendations, preferences, like/dislikes, sharing/collaborations). This data is accumulated by the metadata service 1360. The right-hand column 1380 represents different use/consumption of this data. FIG. 13 shows just a simple example. In the left-hand column, SNS members 1310 are viewing multimedia content 1330 from source 1340. They generate comments or other social data about the content 1330. This social data is associated with certain time points in the video, which are marked by video bookmarks. The video bookmarks and social data are collected by the metadata service 1360.

The metadata service 1360 organizes the bookmarks and social data in a manner that is useful for later consumption. For example, the metadata service may create metadata, make data available for searching, analyze data collected from multiple sources, or organize data according to members, member groups, SNS, content, comment, etc. The data collected by the metadata service also presents data mining opportunities. Note that the metadata service 1360 stores bookmarks rather than full video clips. This has many advantages in terms of reducing storage requirements and increasing processing throughput since the actual video need not be processed by metadata service 1360. Rather, the bookmark is a pointer to the actual video, which is provided by the content source 1340.

In the right-hand column, the video bookmarks are being used. For example, members of a certain SNS group may be viewing content 1330 which has relevant social data. The V in the lower right of the screen indicates that comments from other SNS group members are available for this scene. In FIG. 13, these comments are a discussion thread which is delivered to a different device.

On the creation side 1370, the video bookmarks may be created in a variety of ways by a variety of entities. For example, video bookmarks may be created during the content production process. Producers, directors, editors and others may generate video bookmarks during production and editing. This may occur in the editing studio or on-site. For example, many producers/directors use portable video editing studios on-site. They may also add supplemental content, such as directors' comments or extra scenes and clips.

Video bookmarks may also be created post-production. For example, the content may be completed and then the producing studio may go back through the video to insert video bookmarks. This may happen either pre-release or post-release. Third parties, for example content delivery network (CDN) operators, may also create or add to video bookmarks. For example, CDN operators might add information about the content: title, genre, directors, producers and other information related to the content. They might also add promotional scenes. CDN operators, producers, directors and others may select certain scenes or video bookmarks as promotional scenes, possibly for viral promotion. CDN operators might also add playback duration to video bookmarks. If a user clicks a video bookmark, the CDN operator may play it for free for a certain period, say 30 seconds or several minutes, possibly as a teaser to purchase the full video. These tasks could be done manually or with software. Automated scene finders may be used to create video bookmarks for the beginning of each scene. Metadata, such as keywords or tags or local time of a live event, can also be added.

Video bookmarks could also be created by SNS members. In the example of FIG. 13, SNS members are commenting on the content, and these comments and corresponding bookmarks are collected by the metadata service 1360. The video bookmarks could be pre-existing bookmarks and the comments are then just attached to the existing bookmarks. Alternately, the video bookmarks could be created as the SNS members are making comments.

In addition to the bookmarks, the metadata service 1360 also collects additional information about the content from the SNS members. In FIG. 13, this is labelled social data. This could include SNS members' comments about the content; graphical, audio, text or hypertext annotations on the content added by SNS members; and discussion threads. Other examples of social data are SNS interactive data, such as likes/dislikes, sharing, tweeting/retweeting, etc. The SNS members' interactions on particular video bookmarks or scenes can be chosen to promote the content virally among other users. Interactions could also include the directors', producers', actors', etc. remarks or reactions. Interaction could also occur at the video bookmark-level or at the scene-level, rather than for the entire video.

The metadata service 1360 can also collect information about the SNS member or SNS group, which shall be referred to as SNS metadata. Examples are member or group profile, face, name, hashtag, personal ID, group ID and group host.

Another category is information about the social interaction itself, which shall be referred to as interaction metadata. Examples include time of SNS member's comment; location of SNS member when he makes the comment, or of other SNS members when they playback the content or comment; device type used by the SNS member; and viewing or other preferences of the SNS members. Some of the interaction metadata may be about the content itself. Playback duration of the relevant video clip; or text, audio/voice, faces or other identifiable objects from the content are some examples.

On the consumption side 1380, consumption begins with identifying relevant interactions. This could happen in different ways. In the example of FIG. 13, the "V" in the screen indicates there is a discussion thread on this scene, and the discussion thread appears in the SNS member's separate device. Other implementations will be apparent. For example, the discussion thread could appear within the playback screen. Or it could be toggled on and off, or retrieved only upon request.

In an alternate approach, the metadata service 1360 is searchable. For example, it may be searchable by keywords, tags, content, scenes, audio, voice, SNS member/group, or metadata for any of those. It may also do analysis on the data, such as trending keywords, popular content or discussion threads, or trends by SNS member or group. Upon finding an interesting record, the SNS member can replay the relevant content by using the attached video bookmark. The metadata service 1360 itself does not store or serve the video or video clip. Rather, the metadata service 1360 stores the bookmark, which points to the content and its source 1340.

Returning to the example of FIG. 13, the metadata service 1360 includes a video bookmark for the wedding kiss scene. It also includes social data about this scene, which in this example is a thread of comments about the scene. It may also include supplemental content, such as director's comments or information about the actors. It may also include content metadata, such as Actor=Chris, Karen, Keyword=Kiss, Location=New York Central Park and Promotional=Wedding. It may also include SNS metadata or interaction metadata, such as additional information about the SNS members making the comments, or the time or location of the comments.

Preferably, the metadata service 1360 is operated independently from the content sources 1340 and the SNS services. In this way, the metadata service 1360 can aggregate over many content sources 1340 and SNS services. Large amounts of content and corresponding social data can be cataloged, tracked and analyzed. This metadata can then be made available through many types of SNS services. Note that although the metadata service 1360 may catalog and analyze large amounts of data, that data may not be owned by the metadata service. For example, the underlying content typically will be owned by the content source rather than the metadata service, as will be any supplemental content or content metadata provided by the content source. Similarly, social data, SNS member data and metadata typically will be owned by the SNS service provider and/or individual member. Redistribution of any of this data may be subject to restrictions placed by the owner, including privacy rules.

The metadata service 1360 can coordinate with content providers (or other providers of video bookmarks and metadata) in a number of ways. For example, the metadata service might provide an API or a standard format for video bookmarks. Content providers may also use specialized software, add-on or plug-ins to coordinate backend data creation and provision. SNS members may also gain access via a number of different ways. Their underlying SNS may integrate this service so that it appears to be native to the SNS offering. Alternately, it may be provided as a separate app, add-on or plug-in—either to the SNS service or to the video playback device, or available through a web site.

Figure 14A:
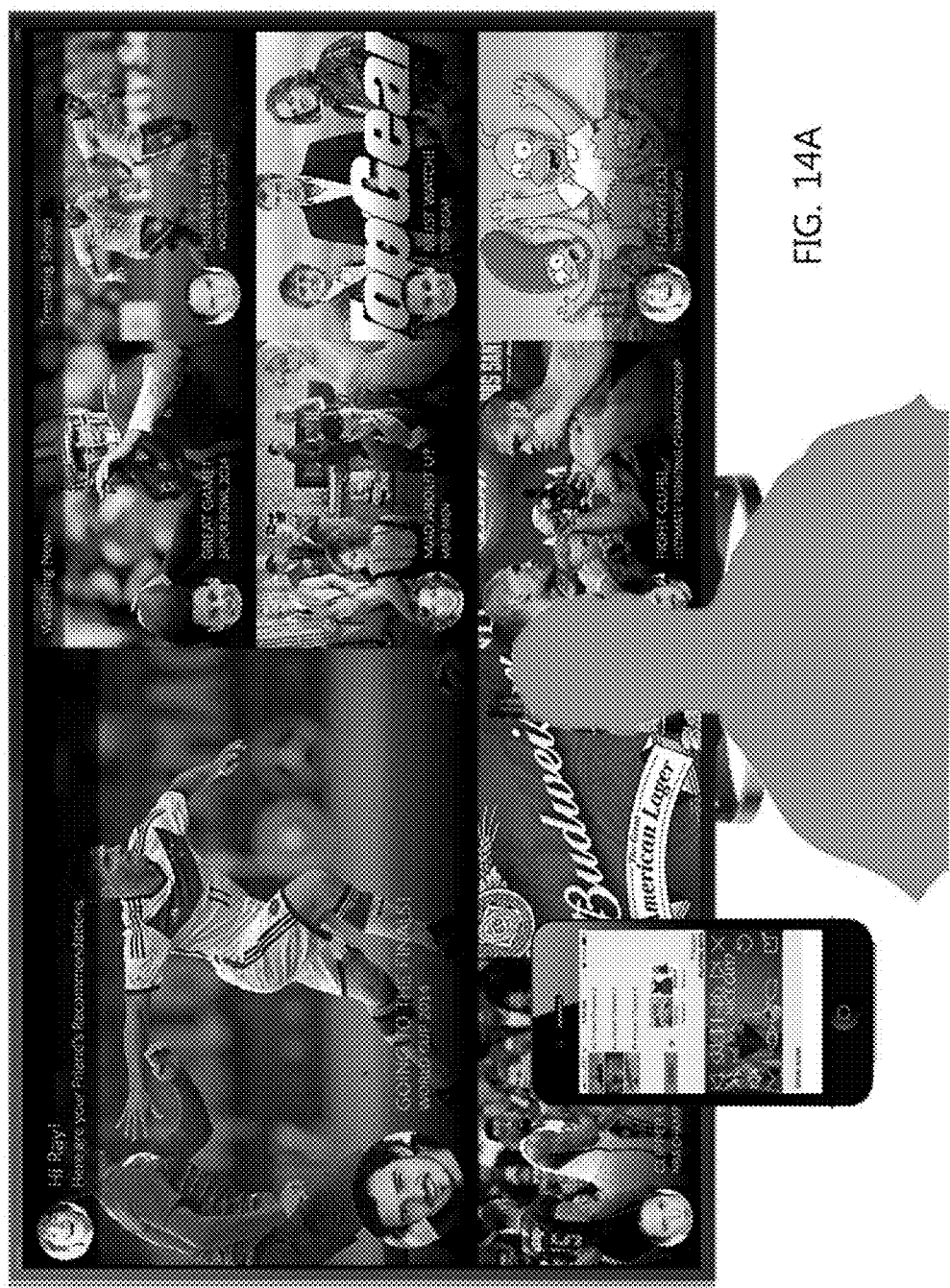

FIGS. 14A-G show additional example use cases of the metadata service 1360. In FIG. 14A, Ray is interested to view content and the metadata service 1360 provides recommendations from Ray's friends. One friend recommends a World Cup 2014 match. Others recommend Mad Men, Top Gear, the Simpsons, etc. One friend is currently watching Super Bowl 2014, so Ray could join if he wanted to. The World Cup 2014 Brazil game is a top trending show. Ray may access related SNS services or view content via his mobile phone. The metadata service 1360 also serves a targeted ad for Budweiser beer, based on Ray's and his friend's viewing habits and recommendations.

Figure 14B:
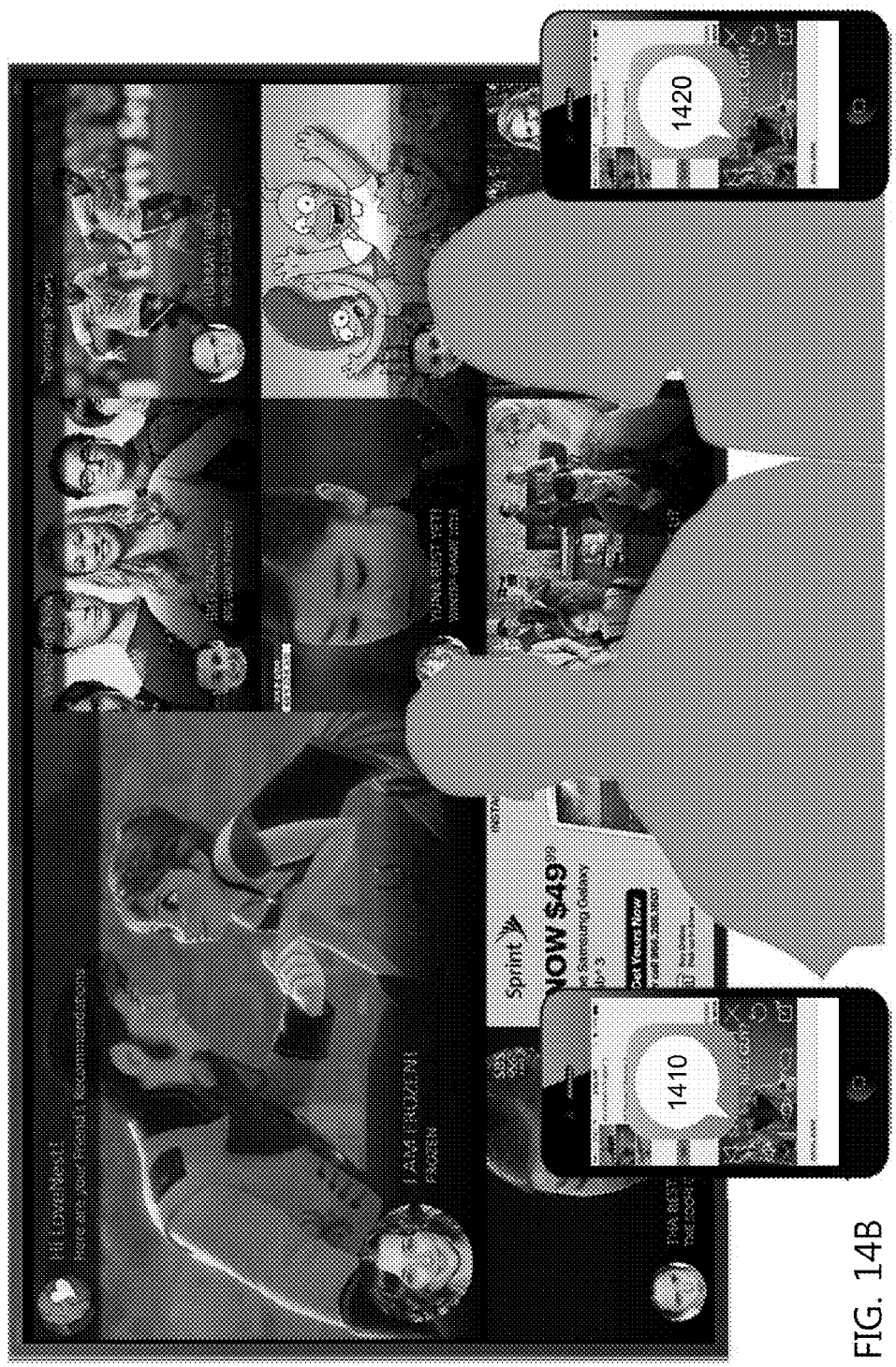
Figure 14C:

In FIG. 14B, Ray decides he does not want to view content by himself, so he invites 1410 his girlfriend to join him, virtually. She accepts 1420. They are a group (LoveNest) and the metadata service 1360 now provides personalized recommendations and targeted ads based on the group, rather than based on Ray alone. Ray and his girlfriend decide to watch the World Cup 2014 Brazil match, as shown in FIG. 14C.

Figure 14F:
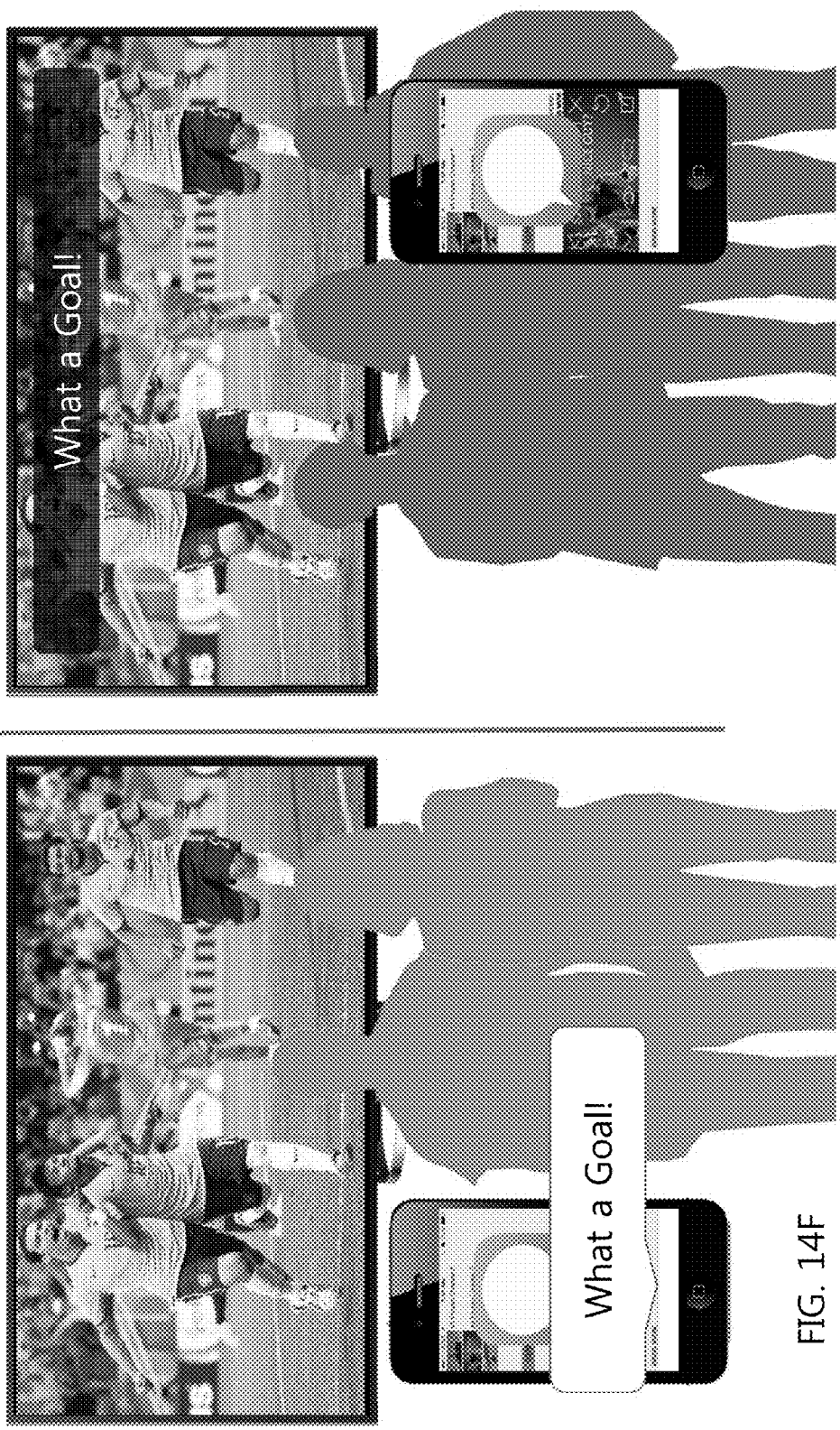

At the same time, another group of Ray's friends is watching TopGear, as shown in FIG. 14D. In FIG. 14E, the LoveNest group invites 1430 the other group to join watching the World Cup 2014 Brazil match. The other group accepts 1440 and their content stream is changed to match the content that LoveNest is watching. In FIG. 14F, Ray types "What a Goal!" In FIG. 14G, someone from the other group responds "Yeahhhh!" The discussion thread can be recorded by the metadata service 1360, and then accessed by another of Ray's friends at a later time. In this way, friends can have a shared viewing experience even though they are not physically together. In a further enhancement, members' or groups' schedules can be attached to video bookmarks to coordinate group viewing, particularly if members are in different time zones or traveling.

Although the detailed description contains many specifics, these should not be construed as limiting the scope of the invention but merely as illustrating different examples and aspects of the invention. It should be appreciated that the scope of the invention includes other embodiments not discussed in detail above. For example, the video bookmark may take different forms and contain different amounts of information. In one example, video bookmark itself may contain the actual text from the video. This is especially useful for news segments. When users cannot access the SNS or video source, they can read the text contained in the video bookmark. TV stations sends out such text information during broadcasting via teletext format and the metadata service can capture the text and attach it to the video bookmarks automatically. This view of text can also generate rapid viral spread of the message/bookmarks, which in turn can generate more video playbacks—i.e. enhance rating of the video.

Figure 15B:
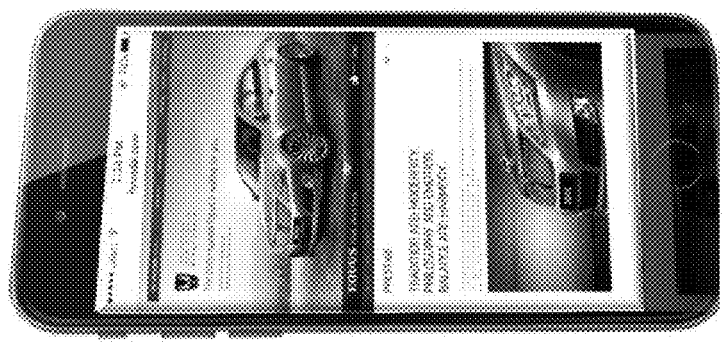
FIG. 15B shows the corresponding product web site when the QR code is activated.
Figure 15A:
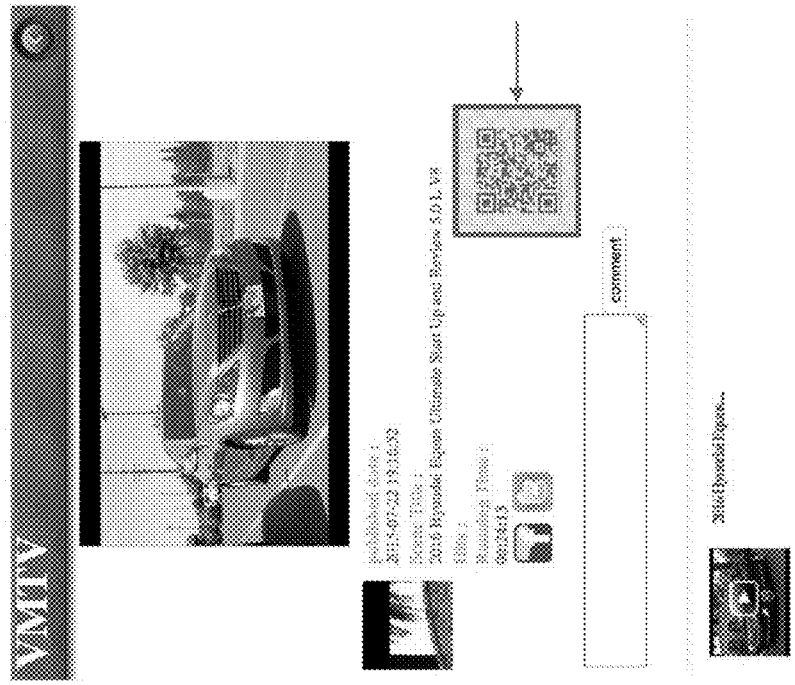
FIG. 15A shows a video bookmark tagged with a QR code for product placement.

In another aspect, promotional data can be attached to the video bookmarks. For example, appropriate QR codes, bar codes, web links or other types of embedded product marketing may be used to enhance product placements. In this way, the user can more quickly access the product of interest. The "products" being placed can be actual products such as cars, alcohol, and luxury products, but they may also be services, charities, donations, public service announcements, targeted advertisements or other types of promotional information. If the content is indexed for later searching, it is preferable to also include appropriate keywords to facilitate searching. For example, FIG. 15A shows a situation where a video bookmark is tagged with a QR code 1510 for the automobile in the scene. Activating the QR code brings the user to a web site advertising the automobile, as shown in FIG. 15B. In one approach, the QR code is automatically generated when the scene is bookmarked.

In another aspect, the video bookmark and corresponding metadata can also be used to target ads. Metadata that is tagged to a video bookmark is also tagged to a time point in the video, since the video bookmark is tied to a time point in the video. This information can be used to determine what ads to insert, for example for preroll, mid-roll and post-roll. Advertisers may also be able to search or analyze metadata to determine more effective ad placement. For example, an auto maker may search for its makes and models of cars for ad placement.

In another aspect, the video bookmark or the metadata service may be used to change the programming channel. As an example, in a situation where a user is watching video on a TV and social networking on a mobile device, activating a video bookmark on the mobile device may automatically change the channel on the TV to the selected program. The video bookmark may also be used to locate the multimedia file within locally connected home consumer electronics devices such as a DVR (Digital Video Recorder) or NAS (Network Attached Storage), to retransmit or broadcast certain comments to a broader audience (e.g., a producer, actor/actress, or reporter of certain video may want to let a broad audience know about their content prior to broadcasting or afterwards to increase both real-time and time-shifted ratings), or to use certain thread/comments in related advertising commercials. In alternate embodiments, the pointer to the multimedia content could be solely the web address or location of the video (i.e., without thumbnail and additional other information). The pointer or video bookmark could also point to a short video clip or other intermediate content, which in turn leads to the full multimedia content.

In another aspect, most of the examples above discuss the use of individual video bookmarks. However, the same examples can also be applied to a series or set of bookmarks. For example, a set of bookmarks presented in sequence may be a good summary or highlights of the underlying content. SNS members may comment on individual video bookmarks or on sets of subsets of bookmarks.

In addition, content may have different versions or renditions. For example, video can have different versions optimized for playback on different devices, in different languages, or through different networks. In one approach, a single bookmark refers to all of the versions and the correct version is determined by other means. In another approach, different bookmarks refer to the different versions. As another example, multiple angles or views may be available or multiple audio tracks may be available. In one approach, a single bookmark refers to all of the versions and the correct version is determined by other means. In another approach, different bookmarks refer to the different versions.

Figure 16A:
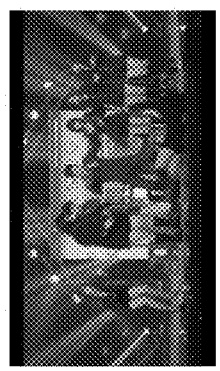
FIGS. 16A-B show examples of a static thumbnail and sequence of thumbnails, respectively, for a video bookmark.
Figure 16B:
Figure 17A:
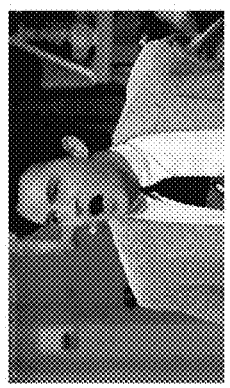
FIGS. 17A-B show additional examples of a static thumbnail and sequence of thumbnails, respectively, for a video bookmark.
Figure 17B:

Bookmarks can also take different forms. For example, a video bookmark can include an animated GIF (e.g., a sequence of thumbnails) instead of a static thumbnail. An animated GIF can convey more information and attract more attention than a static thumbnail, while still using significantly less data storage than a full video clip. FIGS. 16-17 show two examples. FIG. 16A shows a static thumbnail included as part of a video bookmark. In the thumbnail, one of the cast members appears to have fallen on the ground. FIG. 16B shows an animated sequence of 8 frames included as part of a video bookmark for the same time point as FIG. 17A. The animated GIF shows the cast member walking, slipping, falling and then being helped up off the ground. It is much more dynamic and understandable than the static thumbnail. Similarly, FIG. 17A shows a static thumbnail, while FIG. 17B shows a sequence of thumbnails for the same marked time point. Sequences of thumbnails can be composed in different ways. For example, the sequence may be composed of a fixed number of frames around the time point marked, or based on a variable number of frames. The frames may occur before and/or after the time point.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for providing promotional information relating to a video, the method comprising:
   providing a video bookmark relating to a video to a member of an Internet-based social network services (SNS) from another member of the SNS according to privacy rules of the SNS, wherein the video bookmark marks a time point in the video and activating the video bookmark causes playback of the video from the marked time point; and
   additionally providing to the SNS member promotional data relating to the marked time point in the video, wherein the promotional information is attached to the provided video bookmark.

2. The method of claim 1 wherein the video is provided to the SNS member by a video source, the video bookmark is maintained by a metadata service, and the metadata service is operated by an entity different than entities operating the social network service and the video source.

3. The method of claim 1 wherein the promotional data relates to a product shown in the video at the marked time point.

4. The method of claim 1 wherein the promotional data relates to a service shown in the video at the marked time point.

5. The method of claim 1 wherein the promotional data is for a product placement in the video at the marked time point.

6. The method of claim 1 wherein the promotional data relates to a content of the video at the marked time point.

7. The method of claim 1 wherein the promotional data is an advertisement relating to a content of the video at the marked time point.

8. The method of claim 1 wherein activating the promotional data provides to the SNS member additional promotional information.

9. The method of claim 1 wherein the promotional data is a QR code.

10. The method of claim 1 wherein the promotional data is a bar code.

11. The method of claim 1 wherein the promotional data is a web link.

12. The method of claim 1 further comprising:
automatically generating the promotional data when the video bookmark is created.

13. The method of claim 1 wherein the video bookmark includes a thumbnail of a frame of the video from the marked time point.

14. The method of claim 1 further comprising:
additionally providing to the SNS member social data from other SNS members relating to the marked time point in the video.

15. The method of claim 14 wherein the social data includes at least one of other SNS members' comments about the video, annotations on the video added by other SNS members, other SNS members' recommendations, other SNS members' preferences, other SNS members' likes/dislikes, and sharing/collaborations between SNS members.

16. The method of claim 1 wherein one of the social network services is one of Facebook, Twitter, an instant messaging service, a chat service or other messaging service.

17. A computer program product for use with a computer, the computer program product comprising a non-transitory computer usable medium having a computer program code embodied therein for providing promotional information relating to a video, the computer program code performing the steps of:
providing a video bookmark relating to a video to a member of an Internet-based social network services (SNS) from another member of the SNS according to privacy rules of the SNS, wherein the video bookmark marks a time point in the video and activating the video bookmark causes playback of the video from the marked time point; and
additionally providing to the SNS member promotional data relating to the marked time point in the video, wherein the promotional information is attached to the provided video bookmark.

18. The computer program product of claim 17, wherein the video is provided to the SNS member by a video source, the video bookmark is maintained by a metadata service, and the metadata service is operated by an entity different than entities operating the social network service and the video source.

19. The computer program product of claim 17, wherein the promotional data relates to a product or a service shown in the video at the marked time point.

20. The computer program product of claim 17, wherein the promotional data relates to a content of the video at the marked time point.

* * * * *